(12) United States Patent
Graf et al.

(10) Patent No.: US 7,656,572 B2
(45) Date of Patent: Feb. 2, 2010

(54) METHOD, ARRAY, AND INFLUENCING UNIT FOR SAID ARRAY IN ORDER TO MODIFY A WAVEFRONT OF AN OPTICAL BEAM

(75) Inventors: Thomas Graf, Nufringen (DE); Eduard Wyss, Spiez (CH)

(73) Assignee: Universitat Bern, Bern (CH)

( * ) Notice: Subject to any disclaimer, the term of this patent is extended or adjusted under 35 U.S.C. 154(b) by 354 days.

(21) Appl. No.: 10/546,926

(22) PCT Filed: Feb. 17, 2004

(86) PCT No.: PCT/EP2004/001473

§ 371 (c)(1),
(2), (4) Date: Jun. 15, 2006

(87) PCT Pub. No.: WO2004/077135

PCT Pub. Date: Sep. 10, 2004

(65) Prior Publication Data

US 2006/0256419 A1    Nov. 16, 2006

(30) Foreign Application Priority Data

Feb. 26, 2003    (EP) .................................. 03405128

(51) Int. Cl.
*G02F 1/01* (2006.01)
(52) U.S. Cl. .................... 359/288; 359/246; 359/238
(58) Field of Classification Search ............... 359/288
See application file for complete search history.

(56) References Cited

U.S. PATENT DOCUMENTS 2,644,938 A * 7/1953 Hetzel et al. ................ 348/774
4,264,146 A    4/1981 Sutton (Continued)

FOREIGN PATENT DOCUMENTS

| EP | 1 030 206 A3 | 8/2000 |
|---|---|---|
| EP | 1 050 766 A3 | 11/2000 |
| EP | 1 118 897 A3 | 7/2001 |
| EP | 0 744 641 B1 | 9/2001 |
| EP | 1 191 377 A3 | 3/2002 |
| EP | 0 943 947 B1 | 9/2003 |

(Continued)

OTHER PUBLICATIONS

Vdovin et al., Optics Letters, vol. 27, No. 9, May 1, 2002. pp. 677-679.
Wyss et al., IEEE Journal of Quantum Electronics, vol. 38, No. 12, Dec. 2002, pp. 1620-1628.

*Primary Examiner*—Jessica T Stultz
(74) *Attorney, Agent, or Firm*—Birch, Stewart, Kolasch & Birch, LLP (57) ABSTRACT

Disclosed is an array for modifying a wavefront of an optical beam (3) having a beam axis (15). Said array comprises an influencing unit (1) which can be introduced into the beam path of the optical beam (3) and a heat source (12) that generates a thermal pattern and acts upon the influencing unit (1). The influencing unit (1) is provided with at least one planar cooling plate (7a, 7b) that extends transversal to the optical axis (15) of the incident beam (3) and a fluid layer or gel layer (9) which has a two-dimensional expansion, is disposed on the cooling plate with a basal surface, and absorbs the heat of the heat source. The two-dimensional expansion is large enough to receive approximately the entire cross section of the beam. The thickness of the fluid layer or gel layer (9) is embodied in such a small manner that only a minute amount of heat can flow perpendicular to the beam axis (15) while being thick enough for the wavefront of the incident beam (3) to be modified by the heat pattern resulting from thermal impingement of the fluid or gel (9). The wavefront of a beam can thus be influenced in an inexpensive and tailor-made manner. Beams that are influenced in such a way can preferably be used in high-power lasers for creating custom modes.

15 Claims, 5 Drawing Sheets

U.S. PATENT DOCUMENTS

| | | | |
|---|---|---|---|
| 4,492,431 A | | 1/1985 | Eitel et al. |
| 4,615,587 A | * | 10/1986 | Krasutsky et al. ........... 359/288 |
| 4,671,624 A | | 6/1987 | Kahan |
| 4,844,603 A | * | 7/1989 | Eitel et al. .................. 359/845 |
| 4,934,803 A | | 6/1990 | Ealey |
| 5,470,154 A | * | 11/1995 | Nishizawa et al. .......... 374/141 |
| 5,889,256 A | | 3/1999 | Osanai |
| 2002/0021724 A1 | * | 2/2002 | Weber et al. .................. 372/34 |

FOREIGN PATENT DOCUMENTS

| | | |
|---|---|---|
| EP | 1 168 533 B1 | 10/2004 |
| EP | 0 829 745 B1 | 3/2005 |
| SU | 1597834 A1 | 10/1990 |
| WO | WO-01/48747 A2 | 7/2001 |
| WO | WO-02/35274 A1 | 5/2002 |

* cited by examiner

METHOD, ARRAY, AND INFLUENCING UNIT FOR SAID ARRAY IN ORDER TO MODIFY A WAVEFRONT OF AN OPTICAL BEAM

TECHNICAL FIELD

The invention relates to a method for modifying a wavefront of an optical beam, an arrangement for carrying out a method for modifying a wavefront of an optical beam and an influencing unit for the arrangement for modifying a wavefront of an optical beam, it being possible for the influencing unit to be introduced into the beam path of the optical beam and to accommodate the beam cross section of the optical beam approximately completely.

In the following text, optical beams are understood to mean beams of electromagnetic radiation in the visible, infrared and ultraviolet wavelength range. Therefore, radiation in a wavelength range from about 100 nm to 15 µm. The curve of the wavefront in such a beam may be defined as a uniform standardized instantaneous value of the electrical field strength. The form of a wavefront can be measured with a Shack-Hartmann detector.

The wavefront defines locations of equal phase shift of the electromagnetic radiation in a beam starting from a reference surface running perpendicular to the beam axis; as a rule, the beam waist will be used as a reference. The term wavefront should not be confused with the intensity distribution (e.g. of a Gaussian beam) over the beam cross section.

PRIOR ART

A wavefront of a beam can be modified by means of the following known methods.

A wavefront of a beam can be modified by means of a deformation of a surface onto which the relevant beam is guided, or by means of a displacement of a large number of active elements operating independently of one another.

In WO 02/35274 a deformable mirror was described which modified the wavefront of a beam striking it. The mirror had mechanical, hydraulic, piezoelectric or electromechanical actuators for deforming its mirror surface. The reflective surface was fixed by spacers to a diaphragm, on which the actuators acted. A cooling liquid was led between the rear of the reflective surface and the diaphragm for the purpose of mirror cooling.

In EP-A 1 191 377; EP-A 0 943 947; U.S. Pat. No. 4,934,803; U.S. Pat. No. 4,492,431 and EP-A 0 744 641 and also the publication G. Vdovin et al. "Deformable mirror with thermal actuators", Optics Letters Vol. 27, No. 9, pages 677-679, May 1, 2002, in each case a deformable mirror is described which could be deformed by a large number of active elements acting on the underside of the mirror and operating independently of one another (e.g. piezoelectric transducers, electrodistortive elements {lead-magnesium niobate}; pressure pistons, resistance elements).

A wavefront of a beam can also be modified by means of deforming by means of a single actuator an entire surface onto which the relevant beam is led.

In EP-A 1 118 897 and EP-A 1 030 206, an actuator acting axially on a mirror surface is described. The mirror deformation was carried out by means of its elastic deformation. The sphericity of the mirror surface could be influenced, apart from via the cross-sectional geometry of a retaining ring, via a centrally symmetrical weakening within the mirror plate, and by means of static positive pressure of a fluid-filled chamber behind the mirror plate. Heat losses arising in the mirror plate were led away via a fluid filling of the chamber.

In SU 1 597 834, a bimetallic plate was used to produce a deformable mirror.

A modification of a wavefront of a beam can also be carried out by means of its reflection at a surface deformed by the application of pressure.

In U.S. Pat. No. 5,889,256, a deformable mirror was described as a housing cover. If a vacuum was applied to the interior of the housing covered by the mirror, the center of the mirror was pulled inward, as a result of which the imaging characteristics of the mirror were modified.

A wavefront of a beam can additionally be modified by the use of a large number of drivable reflective elements, as described in EP-A 1 050 766. The individual mirror elements were connected to one another in such a way that they could be deflected by applying an electric voltage to an electrode located in the vicinity. In simple terms, the deflection was carried out in a manner analogous to the unit operating with vacuum.

In WO 01/48747, an optical wavefront modulator is described which has a ferroelectric liquid crystal which was provided on both sides with a transparent electrode structure pattern to modify its local refractive index.

In U.S. Pat. No. 4,264,146, a cooled laser mirror is described which was cooled differently in the region of the upper and lower side of the mirror in two directions running at right angles to each other parallel to the mirror surface.

In EP 1 168 533, compensation of the wavefront is described. The compensation is intended to eliminate optical changes brought about by radial temperature gradients in optical components. In EP 1 168 533, an attempt is made to achieve an approximately equal radial heating distribution in the optical component and in the compensation medium. The radial temperature gradients were achieved by both media experiencing the same cooling at their circumference.

SUMMARY OF THE INVENTION

Object of the Invention

The object of the invention is to influence the waveform of a beam in an inexpensive, tailored manner, it preferably being possible for beams influenced in such a way to be used in high power lasers to produce what are known as "custom modes".

Achievement of the Object

According to the invention, the object is achieved in that a two-dimensional modulation layer is arranged transversely with respect to the optical axis of the beam in such a way that a beam cross section of the optical beam is accommodated approximately completely. At least one of the two basal surfaces of the modulation layer is cooled two-dimensionally, is locally loaded by a thermal pattern and the layer thickness is chosen to be so thin that propagation of heat transversely with respect to the optical axis is negligibly small. The expression basal surface is used as opposed to the circumferential surface. A cylinder has, for example, two basal surfaces and one lateral circumferential surface. In the case of a straight circular cylinder, there would be two mutually parallel basal surfaces.

However, in the modulation layer, the layer thickness must in turn be chosen to be so thick and the thermal pattern must be chosen such that the wavefront of the incident beam can be modified by the thermal pattern on the basis of thermal action on the modulation layer. As opposed to the prior art, in the case of the invention, while applying a thermal pattern in or to the modulation layer, at least its one basal surface is cooled two-dimensionally. As a result, the thermal pattern impressed into the modulation layer is not blurred over the beam cross section.

Here, the thermal pattern is impressed into a fluid or gel layer as a two-dimensional modulation layer. The fluid used is preferably liquids and the gels used are preferably curing gels with the properties described below; their viscosity should preferably be above 100 cP. Instead of fluids and gels, solid bodies can also be used, their optical properties generally changing less as a result of the application of a thermal pattern.

As opposed to the invention, EP 1 168 533 mentioned at the beginning pursues a different objective. EP 1 168 533 impresses the same optical temperature gradient on the compensation element and the optical component by means of uniform radial cooling and intimate contact between these two elements. This is not the intention of the invention. The invention does not operate with radial cooling, that is to say cooling acting coaxially with respect to the beam axis, but with two-dimensional cooling of at least one basal surface of the modulation layer. Expressed somewhat more loosely: the wavefront of the beam to be influenced "passes through the cooling surface". In addition, in the case of the invention an "externally produced" thermal pattern is impressed and operations are not carried out, as in EP 1 168 533, with the absorption of the radiation of the optical beam whose wavefront is to be influenced.

In order to achieve the object, use is made of an arrangement according to the invention which, in order to modify a wavefront of an optical beam, operates with an influencing unit which can be introduced into a beam path of the beam and a heat source producing a thermal pattern. The heat source acts on the influencing unit. The influencing unit has at least one two-dimensional cooling plate running transversely with respect to the optical axis of the incident beam, and also a fluid or gel layer arranged on the latter and absorbing the heat from the heat source, as a modulation layer with a two-dimensional extent. At least one of the basal surfaces of the modulation layer is in intimate contact with at least one cooling surface. The extent is sufficiently large to accommodate the beam cross section approximately completely. The layer thickness of the fluid or gel layer is designed to be so small that only a vanishingly small flow of heat transversely with respect to the beam direction can take place. However, the layer thickness is so thick that the wavefront of the incident beam can be modified by the thermal pattern on the basis of a thermal action on the fluid or gel.

In the arrangement according to the invention, in order to achieve the object an influencing unit according to the invention is used. The influencing unit can be introduced into the beam path of the optical beam and can accommodate the beam cross-section of the optical beam approximately completely. The influencing unit has at least one two-dimensionally cooling plate and a fluid or gel layer as a modulation layer which can be occupied by a thermal pattern and has a basal surface in intimate contact with the upper side of the at least one cooling plate. The layer thickness of the fluid or gel layer is chosen to be so thin that two-dimensional propagation of heat is negligible. Furthermore, its layer thickness is chosen to be so thick that the wavefront of the incident beam can be modified by the thermal pattern on the basis of a thermal action on the fluid or gel.

The cooling plate of the influencing unit can now be constructed differently, depending on its configuration and intended purpose.

The material of the cooling plate can be transparent and without noticeable absorption for the heat and also transparent and without noticeable absorption for the optical radiation.

The fluid or gel can be transparent with a negligible absorption for the optical radiation whose wavefront is to be influenced; however, it can also have a predefined absorption for the optical radiation.

The fluid or gel layer can lie with one of its basal surfaces on a single rear or front cooling plate (as based on the beam propagation direction). However, it can also be delimited by a front and a rear cooling plate. If there are a front and a rear cooling plate, the fluid or gel layer is enclosed between solid plates. In order to influence the wavefront, reliance is then substantially placed on a change in the refractive index of the fluid or gel layer caused by a density change. Of the solid plates, one or both plates can be formed as cooling plates, one or both cooling plates not necessarily having to have mutually parallel basal surfaces. The basal surfaces can be flat or enclose an angle with each other; in addition, the basal surfaces can have a non-flat (planar) surface profile. If only a single cooling plate is used, reliance is substantially placed on changing the thickness of the fluid or gel layer. A layer coating which deforms in accordance with the thickness change can then be applied to the fluid or gel layer. If this covering is transparent, operations will be carried out in transmission, it being possible then for the influencing unit to be transilluminated only once by the beam to be influenced. However, it is also possible for only the transparent covering and the fluid or gel layer to be transilluminated and then for reflection to take place at a following mirror. In this case, the fluid or gel layer is then passed through twice.

However, the covering can also be formed to reflect as a front surface.

However, the influencing unit can also be formed in such a way that there is a cooling plate transparent to the optical beam and a heating layer, which can produce a locally different thermal pattern, arranged on the basal surface of the fluid or gel layer which is opposite the cooling plate.

The method according to the invention and the arrangement according to the invention operate with the influencing unit according to the invention explained above. This unit can be designated a thermo-optical wavefront modulator. In the thermo-optical wavefront modulator, the thermal dispersion dn/dT and/or the thermal expansion dL/dT of the material of the fluid or gel layer is utilized. Although, of course, other applications are also possible, a use in high-power lasers for producing "custom modes" is preferably indicated. However, for example a use of an influencing unit can also be provided in order to achieve compensation for thermally induced optical aberrations of a laser rod.

BRIEF DESCRIPTION OF THE INVENTION

In the following text, examples of the method according to the invention, of the arrangement according to the invention and the influencing unit according to the invention will be explained in further detail by using the following drawings. Further advantages of the invention emerge from the descriptive text. In the drawings.

WAYS OF IMPLEMENTING THE INVENTION

Figure 1:
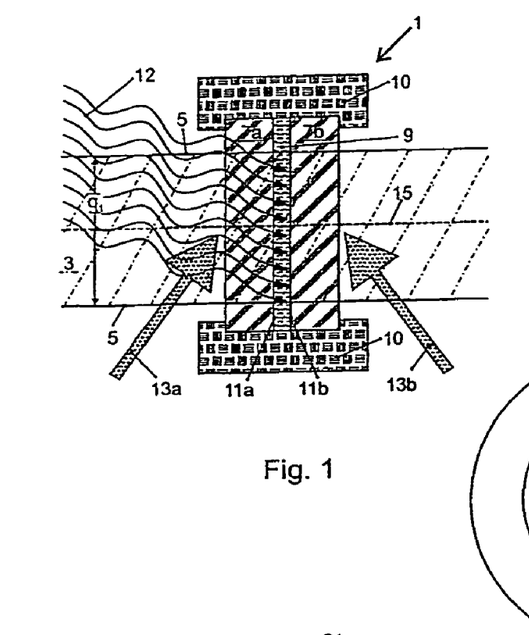
FIG. 1 shows a longitudinal section through a design variant of the influencing unit according to the invention having two two-dimensional cooling plates.
Figure 3:
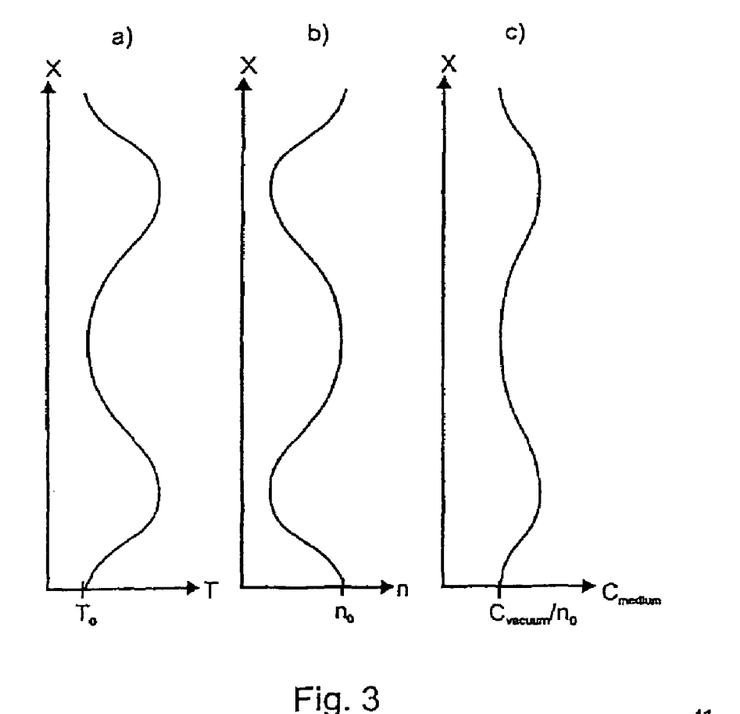
FIG. 3 shows a graph in which, against a transverse coordinate x of the fluid or gel layer which originates from the beam axis and which is at right angles to the optical axis of the incident optical beam, a temperature variation T(x) {FIG. 3a}, the change in the refractive index n(x, T) brought about by the temperature variation T(x) {FIG. 3b} and the variation of the change in the speed of light $C_{medium}(x)$ {FIG. 3c} in a transparent layer brought about by the change in the refractive index are illustrated.

An embodiment of an influencing unit 1 according to the invention for modifying a wavefront of an optical beam 3 is illustrated in FIG. 1. A physical explanation relating to the modification of the wavefront will be explained below by using FIGS. 3a-c and 4. The influencing unit 1 is located in the beam path of the optical beam 3 and is intended to accommodate the beam cross section $q_1$ of the optical beam 3 approximately completely. The boundary lines 5 of the beam 3 in FIG. 1 identify an intensity value of the beam 3 in which its maximum intensity has fallen to the $e^{th}$ part. The influencing unit 1 has at least one two-dimensionally cooling plate; here, there are two cooling plates 7a and 7b. Exemplary embodiments having only one cooling plate are described below. The cooling plates 7a and 7b lie transversely with respect to the optical axis 15 of the beam 3. The cooling plates 7a and 7b lying transversely and parallel to each other are shown as lying at right angles to the optical axis 15 in FIG. 1. Of course, other angles can also be used but an offset of the transmitted beam 3 and distortion of the wavefront modification with respect to the thermal pattern introduced results. An arrangement deviating from a right angle will always be chosen when "distortion" of the wavefront to be produced with respect to the thermal pattern is desired. "Distortion" of this type can be advantageous when anamorphotes are used. The influencing unit 1 has a layer 9 which can be occupied by a thermal pattern on an upper side of the at least one cooling plate, here on the two upper sides 11a and 11b of the two cooling plates 7a and 7b and in intimate contact with their basal surfaces, as a two-dimensional modulation layer.

The cooling plates 7a and 7b enclosing the material of the layer 9 are inserted into an annular holder 10. The holder can be constructed in two parts, as opposed to the illustration of FIG. 1, with inner stops, likewise not illustrated, determining the thickness of the layer 9, for the cooling plates 7a and 7b. The material of the holder 10 can be chosen as desired; however a metal will preferably be used. Between the inner stops, not illustrated, a vent opening for the fluid or gel can be provided, with a vent and/or pressure equalizing opening, likewise not illustrated.

The material of the layer 9 is a fluid or gel, which is specified further below. Since, in the exemplary embodiment described here, there are two cooling plates 7a and 7b, the layer 9 lies with its basal surfaces on the two upper sides 11a and 11b of the two cooling plates 7a and 7b. A thermal pattern is produced in the layer 9 by radiant heat 12 penetrating through the cooling plate 7a from the left-hand side in FIG. 1. The thickness of the layer 9 is chosen to be so thin that two-dimensional propagation of heat in it is negligible, which is additionally achieved by means of the two-dimensional cooling over the basal surfaces at a predefined constant temperature To. This leveling additionally suppresses a transverse flow of heat in the layer 9. However, the layer thickness is chosen to be so thick that the wavefront of the incident beam 3 can be modified by the thermal pattern on the basis of thermal action on the layer 9. The cooling plates 7a and 7b are transparent and without noticeable absorption of the radiant heat 12 producing the thermal pattern and without noticeable absorption of the optical beam 3; the material of the layer 9 is also transparent to the wavelength of the beam 3. The material used for the cooling plates 7a and 7b can be, for example, glass, quartz, sapphire, etc. The outside of the cooling plates 7a and 7b is kept at a constant temperature by an air stream 13a and 13b. The outside sides of the cooling plates 7a and 7b will preferably be rendered nonreflective for the wavelength of the beam 3.

The core of the influencing unit 1 as a thermo-optically adaptive wavefront modulator is the thin layer 9 of a thermo-optically active material with high thermal dispersion (liquid, gel, curing gel). Suitable materials for the thermo-optically active material layer 9 are in particular materials with high viscosity (preferably higher than 100 cP), oils, and gels and curing gels. Good results have been achieved with F-IMF105 (Newport), OCF-446 (from Nye), OC431A (Nye), OCK-433 (Nye) and Sylgard 184 (from the Dow Corning Corp.). The exact layer thickness is determined experimentally, depending on the application. The material is clamped in between two transparent disks, here the cooling plates 7a and 7b of for example glass, sapphire, etc. The disks 7a and 7b are used firstly as a holder and secondly also for cooling the layer material. The thermo-optically active material is heated up locally in accordance with the predefined thermal pattern by means of radiant heat 12, for example originating from a light source (laser) which is not shown in FIG. 1, which emits radiant heat 12 with a wavelength A. The material must therefore absorb the wavelength A. The heat produced in the material, generated by the absorption of the radiant heat, is dissipated by the cooling plates resting on intimately as disks 7a and 7b of glass (or sapphire) to their upper sides 11a and 11b acting as a heat sink. The outside sides can, as indicated in FIG. 1, additionally be cooled actively, if necessary, by means of an air stream 13a and 13b. As a result of the low thickness of the layer 9 and the action of the cooling plates 7a and 7b on the basal surfaces, propagation of the heat in an undesired transverse direction with respect to the beam axis 15 is prevented. On account of thermal dispersion, the locally different heating in accordance with the predefined thermal pattern results in a corresponding two-dimensional refractive index pattern, which produces a predefined two-dimensional velocity-of-light pattern. The light (radiation) of the wavelength B (which differs from the wavelength λ) to be modulated two-dimensionally and physically by the refractive index pattern should not be absorbed in the material of the fluid or gel layer 9.

As already indicated above, the wavefront of the beam 3 is caused by a thermal action by a two-dimensional thermal pattern, which is introduced with corresponding radiant heat 12; the influencing unit can thus be designated a thermo-optical wavefront modulator. In the thermo-optical wavefront modulator the thermal dispersion dn/dT and/or the thermal expansion dL/dT of the fluid or gel layer is utilized.

The action of the thermal dispersion will be explained first below.

The refractive index n of a material, here that of the fluid or gel layer, varies with the temperature T. To a first approximation, this may be described as $$n(T) = n_o + \frac{dn}{dT} \cdot \Delta T \tag{1}$$

where $\Delta T = T - T_0$ is a temperature difference between a standard temperature $T_0$ and a local temperature T produced by the thermal pattern at a predefined location and $n_0$ is the refractive index at the standard temperature $T_0$. Since the velocity of light $C_{medium}$ in a medium depends directly on its refractive index n, this also depends on the temperature T, because of the thermal dispersion dn/dT:

$$C_{medium}(T) = \frac{C_{vacuum}}{n(T)} \tag{2}$$

Figure 2:
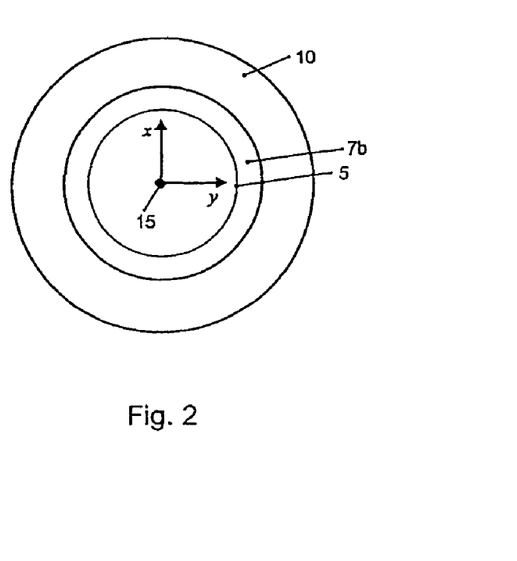
FIG. 2 shows a plane view of the influencing unit illustrated in FIG. 1 in the viewing direction II indicated there.
Figure 4:
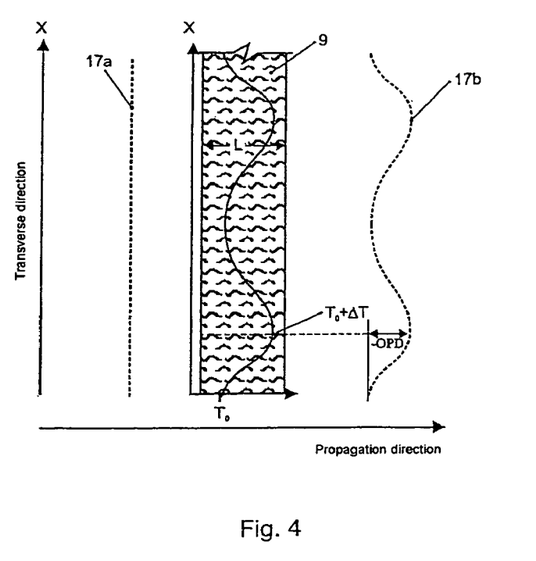
FIG. 4 shows a passage of a planar wavefront through a thermo-optically active layer (fluid or gel layer) having the properties illustrated in FIGS. 3a-c.

This temperature dependence of the velocity of light $C_{medium}$ in a medium can now be utilized to modulate the wavefront of a light beam, here the light beam 3, thermo-optically in the transverse direction. The basic structure and the relationship between a temperature T, a refractive index n and the relevant velocity of light is illustrated in FIGS. 3a to 3c. A relatively thin layer 9 in the millimeter range of a material (fluid or gel) having thermal dispersion is heated up inhomogeneously locally by the radiant heat 12 in accordance with the predefined thermal pattern. An exemplary temperature distribution in the fluid or gel layer 9 is illustrated in FIG. 3a. Here, only the temperature variation in the x direction shown in FIG. 2 is plotted. x is the coordinate of a Cartesian coordinate system x-y which has its origin on the axis 15 of the beam 3. Because of the different velocities of light $C_{medium}$ corresponding to the thermal pattern, an incident, planar wavefront 17a of the beam 3, as illustrated in FIG. 4, will be displaced forward or rearward parallel to the axis 15 of the beam 3, that is to say deformed, as it passes through the layer 9. The planar wavefront 17a has become the influenced wavefront 17b shown in FIG. 4. The wavefront modulator can also "bend straight" again a "curved" wavefront in the opposite direction.

The deformation of a planar wavefront, here the wavefront 17, may be described as an optical path difference OPD as compared with a standard value (equal two-dimensional thickness $L_0$ and temperature $T_0$) in front of and behind the layer 9. The path difference is proportional to the temperature difference and layer thickness for the passage through the layer with the thickness L.

$$OPD(x, y) = [n(x, y) - n_0] \cdot L \tag{3}$$

$$= \frac{dn}{dT} \cdot \Delta T(x, y) \cdot L(x, y)$$

Fluids and gels, in particular curing gels, have a thermal dispersion of the order of magnitude of about $-3 \cdot 10^{-4}/°$ C. For comparison, water would have a thermal dispersion dn/dT of $-1.0 \cdot 10^{-4}/°$ C. Here, during the transmission of the beam 3 through a layer occupied by a thermal pattern, that is to say a heated layer, here for example the layer 9, an optical path difference of $-0.3$ μm per ° C. temperature difference and millimeter layer thickness results. Depending on the thermal pattern impressed onto the fluid or gel layer, a path length pattern or, relative to a standard value, a path difference pattern OPD(x, y) will be obtained.

Figure 5:
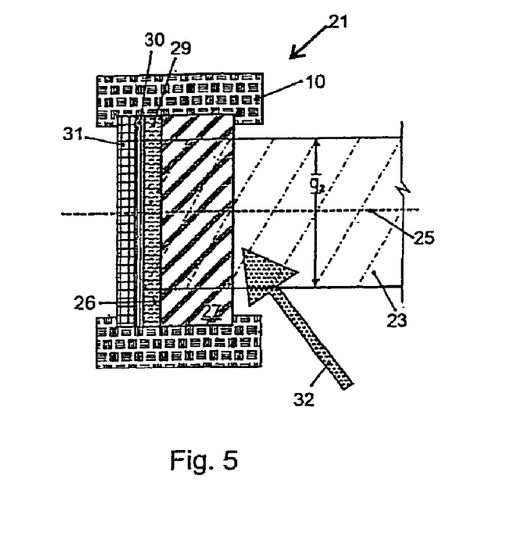
FIG. 5 shows a longitudinal section through a design variant of the influencing unit according to the invention formed as a thermo-optically adaptive mirror having only one cooling plate and a reflective covering.
Figure 6:
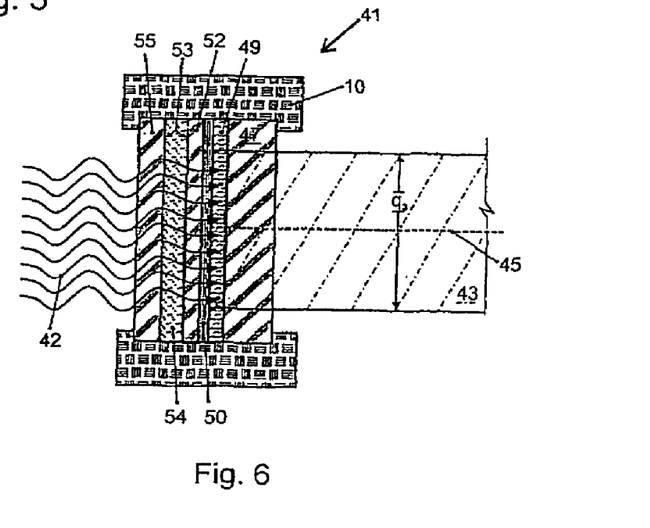
FIG. 6 shows a longitudinal section through a variant of the thermo-optically adaptive mirror illustrated in FIG. 5.
Figure 8:
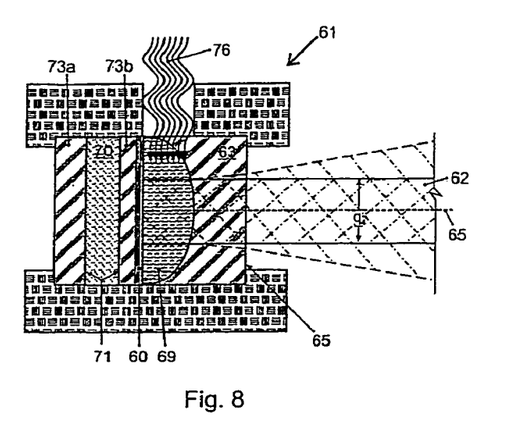
FIG. 8 shows a longitudinal section through a variant of an influencing unit with adaptive lens action.

The thermal dispersion dn/dT for modifying a wavefront is also used in the influencing units 21, 41 and 61 illustrated in FIGS. 5, 6 and 8, in addition to the influencing unit 1 illustrated in FIGS. 1 and 2.

Apart from the effect of thermal dispersion dn/dT used above, the thermal expansion of a material can also be used in influencing units. Materials expand with increasing temperature. The length difference ΔL is proportional to the temperature difference ΔT and to the length L of the material (here the thickness of the fluid or gel layer):

$$\Delta L = \alpha \cdot L \cdot T \tag{4}$$

where α is the expansion coefficient. If an inhomogeneous temperature distribution is produced in a material layer, then the material will expand differently. This can be utilized in two ways. Firstly, the surface of the layer can be deformed differently by the temperature distribution. If, then, a boundary layer following the deformation is applied to this surface, an influencing unit with an adaptively deformable region results from this. The boundary layer will preferably be formed so as to be reflective (adaptively deformable mirror); it can also be a transparent film, however.

In an adaptively deformable mirror, the optical path difference OPD for an incident and then reflected beam is:

$$OPD(x,y) = -2 \cdot \Delta L(x,y) \tag{5}$$

OPD is shown in FIG. 4. The factor 2 is caused by the reflection at the mirror. Since an expansion shortens the optical path, this value is negative.

If the light is transmitted through the fluid or gel layer, the optical path in the material is additionally lengthened by the expansion of the material, because of the higher refractive index. The expansion ΔL(x,y) in this case effects an optical path difference OPD (as compared with air) of;

$$OPD(x,y) = (n_{material}(x,y) - n_{air}) \cdot \Delta L(x,y) \tag{6}$$

Since the light beam passes through the material (fluid or gel), the effect of the thermal dispersion additionally comes into play here. Therefore, in this case, this is utilization of both thermal effects (in the case of negative thermal dispersion, effects can also cancel one another out). Overall, the result is formally an optical path difference during a single passage of:

$$OPD(x, y) = \left(n_0 + \frac{dn}{dT} \cdot \Delta T(x, y) - n_{air}\right) \cdot \Delta L(x, y) + \frac{dn}{dT} \cdot \Delta T(x, y) \cdot L \tag{7}$$

A further influencing unit 56 as a design variant of the influencing unit 41 shown in FIG. 6, but with the thermal expansion explained above being used, is illustrated in FIG. 7. As compared with the embodiment in FIG. 6, here one side of the plate 47 covering the fluid or gel layer 59 and also the reflective covering 50 on the other side of the fluid or gel layer 59 is removed. A reflective layer 57 is arranged as an outer layer on the fluid or gel layer 59 in FIG. 7.

Under certain circumstances, the thermo-optically active material (fluid or gel) can be made directly reflective at the surface. Otherwise, the mirror will consist of a thin glass or crystal layer or a film, such as mylar or metal foil.

One advantage of a mirror as compared with a transmitting wavefront modulator is that the rear of the influencing unit remains free. This permits various ways of heating up the thermo-optically active layer:

1. The thermo-optically active layer is heated up optically (with a laser). In this case, the material must absorb this radiant heat.
2. A (thin) absorption layer is applied behind the thermo-optically active material. This layer is heated up locally by means of a laser. The material is heated by thermal conduction.
3. A heating layer is applied behind the thermo-optically active material and heats the active layer locally by means of electric resistances.

Figure 7:
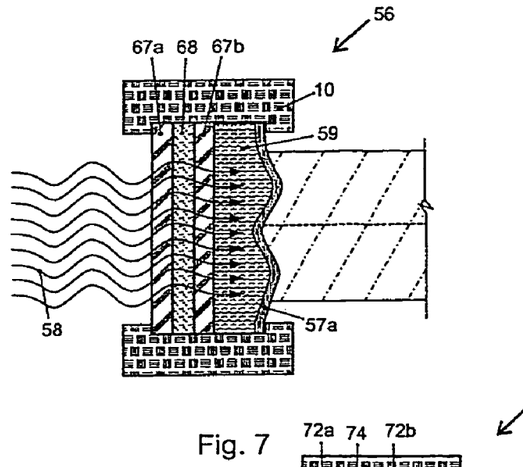
FIG. 7 shows a longitudinal section through a variant of an influencing unit acting as a mirror.

If, then, a thermal pattern is radiated in from the rear by means of radiant heat 58, then "bending" of the reflective layer 57 in accordance with the thermal pattern radiated in takes place. The fluid or gel layer 59 no longer needs to be transparent to the incident optical radiation in this design variant. The two plates 67a and 67b which are formed in a manner analogous to the plates 52 and 55 and which enclose a cooling fluid 68 (e.g. water) should be formed in such a way that they absorb the radiant heat 58 only to a slight extent.

As an influencing unit for modifying a wavefront of an optical beam, here identified by 23, use can also be made of a thermo-optically adaptive mirror 21 illustrated in FIG. 5. Since the influencing unit 21 acts as a mirror, it can now be arranged in such a way that the beam 23 is reflected at an angle or is reflected back into itself, as illustrated in FIG. 5. Here, too, the beam cross section $q_2$ of the optical beam 23 is accommodated approximately completely by the mirror-like influencing unit 21. In addition, the mirror-like influencing unit 21 has a fluid or gel layer 29 which is arranged transversely with respect to the optical axis 25 of the beam 23 which can be radiated in, in such a way that it can accommodate the beam cross section $q_2$ of the beam 23 approximately completely. The mirror-like influencing unit 21 has only a single two-dimensionally cooling plate 27, which is formed in a manner analogous to the cooling plates 7a and 7b, on whose one upper side 26 a basal surface of the fluid or gel layer 29 is arranged in intimate contact. Here, too, the fluid or gel layer can be occupied by a thermal pattern. The fluid or gel layer 29 has a layer thickness which, firstly, is chosen to be so thin that two-dimensional propagation of heat with the aid of the cooling plate 27 is negligible, and, secondly, is chosen to be so thick that the wavefront of the incident beam 23 can be modified by the thermal pattern on the basis of thermal action on the fluid or gel 29. Arranged directly on the side of the fluid or gel layer 29 opposite the cooling plate 27 is a reflective covering 30, which reflects the incident beam 23 with a predefined reflection factor.

As a rule, the intention will be the most complete reflection possible. However, reflection values below approximately 100% can also be chosen if attenuation of the beam 23 is desired at the same time. A heating layer 31 follows the reflective layer on the outside. The heating layer 31 can now be a heating disk having locally drivable heating elements for producing the thermal pattern. The heating layer can, however, also be formed merely as an absorbent surface which is struck by radiant heat with the appropriate thermal pattern. The cooling plate 27 is cooled actively by an air stream 32, this is to say kept at a predefined temperature $T_0$. In the case of this structure, the light beam 23 "to be modulated" passes through the fluid or gel layer 29 twice.

A mirror can also be produced by applying a reflective covering to the adjacent surface of the adjacent element, that is to say here, for example, to the heating layer 31.

The advantage of the influencing unit shown in FIG. 5 is that the action of the thermal dispersion is doubled, since the fluid or gel layer is passed through twice.

A design variant of a thermo-optically active mirror 41 as an influencing unit is illustrated in FIG. 6. Here, too, the influencing unit 41 is intended to accommodate the optical beam 43 with a beam diameter of $q_3$ approximately completely. The influencing unit 41 has, in a manner analogous to the influencing unit 21 and in the same arrangement, a first cooling plate 47 which is transparent to the optical radiation 43 and separates off a fluid or gel layer 49 from the outside. Arranged on the side of the fluid or gel layer 49 opposite the cooling plate 47 is a reflective covering 50. An incident beam 43 to be "modulated" with a beam axis 45 is guided in a manner analogous to the beam 23. On the reflective covering 50, on its side facing away from the layer 49, there is a further cooling plate 52 which is largely transparent to the radiant heat 42 transmitting the thermal pattern, followed by a hollow space 53 for a coolant 54 (e.g. water) and a further plate 55 sealing off the coolant 54 from the outside. Connections for the coolant 54 are not illustrated. The reflective covering 50 does not represent a substantial obstacle to the transmission of the thermal radiation. However, the fluid or gel layer 49 could also be heated via the reflective covering 50. Since the reflective covering 50 is thin, thermal conduction in the transverse direction can be disregarded.

In the influencing units 1, 21 and 41 described above and illustrated in FIGS. 1, 5 and 6, the fluid or gel layer 9, 29 or 49, which is delimited by lateral (front and rear) boundary elements, in which the cooling plates 7a/b, 27 and 47 should be included, are formed with approximately the same layer thickness. In the influencing unit 61 illustrated in FIG. 8 and likewise having a reflective covering 60, the fluid or gel layer is now brought into a predefined form 69 using here a covering plate 63 which is transparent for the beam 62 to be influenced. In FIG. 8, the thickness relationships of the form 69 are illustrated exaggerated. The greatest thickness (in the middle) is about 0.5 to 4 mm given a diameter of the form 69 of typically 0.5 to 3 cm. [In fiber technology (e.g. telecommunications transmission), it is of course possible for smaller dimensions to result.] Here, too, the influencing unit 61 is intended to accommodate the beam radius $q_4$ approximately completely. The covering plate 63 here has an outer side 65 running at right angles to the beam axis 65 and an inner side 66 forming the fluid or gel layer 69. The outer and inner sides can of course be shaped differently. The arrangement of active cooling, for example with a flowing fluid 70, is formed in a manner analogous to that of the influencing unit 41, likewise with two plates 73a and 73b enclosing a hollow space 71 for the cooling fluid 70. Plate 73b serves in particular as a cooling plate; to a limited extent, so does the covering plate 63. The beam 62 is reflected at the reflective covering 60. The influencing unit exhibits a lens effect when a thermal pattern is impressed on it. Radiant heat 76 is now radiated in approximately at right angles to the beam axis 65. The influencing unit 61 acts as a thermally-optically adaptive lens. When determining the mechanical dimensions of the influencing unit 61, attention must be paid to the fact that the entering beam cross section $q_4$ differs from that exiting, since the entire arrangement can act as an optically divergent lens.

While conventional lenses are characterized by an unvarying, predefined refractive power, the refractive power of an adaptive lens may be varied. Such an adaptive lens may be used, for example, to compensate for the thermally induced lens in laser rods. The layer thickness of the thermo-optically adaptive layer 69 (lens form) varies in the direction transverse with respect to the beam axis 65. The absorbed power of the radiant heat 76 in a transverse position (x,y), the origin of the coordinate system lying on the beam axis and x and y extending perpendicular hereto, is proportional to the layer thickness of the fluid or gel layer 69. The thermal resistance (measured parallel to the beam axis 65) at the thicker point of the fluid or gel is additionally increased. The two effects together lead to the temperature in the layer 69 and therefore also to the optical path length for the incident and for the reflected beam being changed in the direction transverse with respect to the optical axis. Given a suitable selection of a predefined form of the layer 69, by means of the thermal dispersion dn/dT impressed by the absorbed radiant heat 76, a course of the inner side 66 which appears parabolic to the beam 62 can be achieved. Thus, by means of homogeneous irradiation, a lens effect can be achieved whose refractive power depends directly on the heating power radiated in. Instead of a separate optical heating source, in this exemplary embodiment the beam to be modulated can itself also be used as a heating source.

If the covering plate 63 and the fluid or the gel are chosen such that they have the same refractive index without the radiant heat 76 being radiated in, then the influencing unit acts as a simple mirror when in the quiescent state (without heating power).

Figure 9:
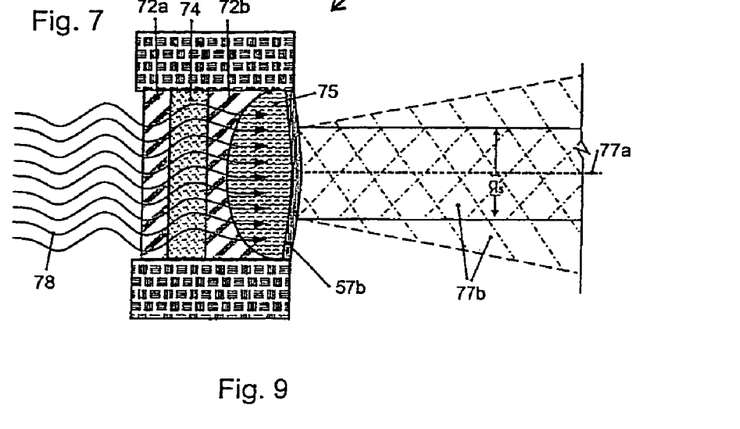
FIG. 9 shows a longitudinal section through a variant of an influencing unit acting as a mirror with adaptive lens action.

In FIG. 7, a flat reflective layer 57a is illustrated which can be deformed as desired by means of the impressed thermal pattern. To this end, FIG. 9 shows a design variant of an influencing unit 82 having a reflective layer 57b. Here, too, in a way analogous to the two plates 67a and 67b, there are two plates 72a and 72b, which enclose a cooling fluid 74 analogous to the cooling fluid 68. As opposed to the plate 67b, here the plate 72b acting as a cooling plate adjacent to the fluid or gel layer 75 as a modulation layer has a surface contour 57b which deviates from a flat plane. Here, too, analogously to FIG. 8, the surface curvature is illustrated exaggerated. In the region of the incident beam axis 77a of an incident and reflected optical beam 77b, the layer is only about 1 mm thick. The incident beam has the beam cross section $q_5$. The reflective layer 57b is arranged on the fluid or gel layer 75 in a manner analogous to the arrangement in FIG. 7. In the quiescent state, this reflective layer 57b in FIG. 9 is a planar surface [but does not have to be; another quiescent surface profile (without any impressed thermal pattern) can also be predefined]. If, here, the radiant heat 78 is radiated in with a heating intensity that is constant over the beam cross section, then the curvature shown in FIG. 9 results. In FIG. 9, the radiant heat 78 occurs longitudinally; however, it can also be guided transversely, as illustrated in FIG. 8. FIG. 9 shows the state with an impressed thermal pattern and with a constant heating power over the beam cross section of the radiant heat 78. The radiant heat 78 can of course also be predefined a different two-dimensional heating power distribution.

For an influencing unit, the production of a two-dimensional temperature distribution T(x,y) which is resolved as highly as possible transversely is necessary. The invention deals with a production of a specifically controllable (adaptively) transverse temperature distribution or a transversely modulated optical path difference. In order to obtain a specific temperature distribution, attention must be paid to the geometric arrangement of the heat source and the heat sink.

The temperature at a point having the coordinates x and y in the thermo-optically active layer is influenced by the ambient temperature as well as by the thermal pattern introduced. In order that the most independent temperature distribution T(x,y) possible can be implemented in the transverse direction, that is to say over the cross section of the beam 3, 23 and 43 to be radiated in and, to a certain extent, in the cross section of the beam 62, the heat flow must take place as far as possible only in the longitudinal direction, that is to say parallel to the beam axis 15, 25, 45 and 65 of the incident beam 3, 23, 43 and 62.

By means of two-dimensional cooling of the thin thermo-optically active layer, a flow of heat in the longitudinal direction can be generated without noticeable propagation in the transverse direction.

In order to achieve this, the cooling system must be suitable for the heat output to be dissipated. While, in the case of low heating power for producing the thermal pattern, the ambient air sweeping along a cooling plates may be adequate under certain circumstances, cooling must be carried out actively at higher heat outputs. Two-dimensional water cooling or two-dimensional air cooling can be used. In this case, the thermo-optically active material does not have to be in direct contact with the heat sink. A further layer of glass, quartz or other material can be located in between. In order that the resultant temperatures in the thermo-optically active material can be kept to a low level and, in addition, a flow of heat in the transverse direction can be prevented, the thermal resistance of this layer should be correspondingly low.

As a further cooling possibility, rod cooling should be mentioned. In this case, the thermo-optically active material is in intimate contact with the end face of a rod and extends over this end face. The heat sink is then located on the circumferential surface at the other end of the rod. Although in this case the heat flows in the transverse direction at the other end of the rod, the flow of heat from the material at the first end of the rod takes place in the longitudinal direction. The disadvantage with rod cooling is that the temperature in the thermo-optically active material will be increased on account of the thermal resistance of the rod, which must be relatively long.

Local increases in the temperature for producing a thermal pattern can be implemented by various methods:

Selective heating of the thermo-optically active material can be achieved by means of local electric heating elements or by means of absorption of electromagnetic radiation. In the case of "electric" heating, the heat source is not in the thermo-optically active material. The thermal pattern is produced by means of a local transfer of heat originating from a heating element which rests on the surface of the thermo-optically active material. In the case of the absorption of electromagnetic radiation, the thermo-optically active material is heated locally directly in the layer.

A thermal pattern can even be produced when there is homogeneous irradiation of electromagnetic radiation, with a predefined local variation of absorption properties. In this case, temperature distributions (thermal patterns) can be implemented in a simple manner by means of simple heat sources.

However, homogeneous heating with suitably shaped elements can also be carried out, suitably shaped being understood to mean a two-dimensionally different layer thickness.

Since there are different layer thicknesses at different local coordinates, the result in the case of uniform heating is an optical path length which is different from the geometric path length. Each material, even the thermo-optical material, has a thermal resistance R. The thermal resistance is proportional to the layer thickness L of the material and inversely proportional to its thermal conductivity k. In the case of a predefined thermo-optical material, the thermal resistance R can therefore be influenced by means of the configuration of the layer thickness L. On the other hand, the thermal resistance R has an effect on the resultant temperature variation in the thermo-optical material. For instance, if the thermo-optical material is heating up locally with a heating power Q, then the resultant temperature in the layer depends critically on the thermal resistance R. If, then, the layer thickness L is chosen differently in a transverse dependence on x, y, the resultant temperature difference $\Delta T(x,y)$ can therefore be influenced in a tailor-made fashion.

As equations (3) to (7) show, the optical path difference OPD also depends on the layer thickness L, apart from the temperature difference $\Delta T$. Therefore, by means of a predefined variation of the layer thickness L in the transverse direction, the optical path difference OPD can be influenced twice:

If a thermo-optical layer is chosen with a different thickness and the material is heated by means of a homogeneous heating beam, then, as a result of the predefined variation in the layer thickness L, a predefined transverse temperature distribution results and, in this way, corresponding optical path differences (→thermal patterns).

Figure 10:
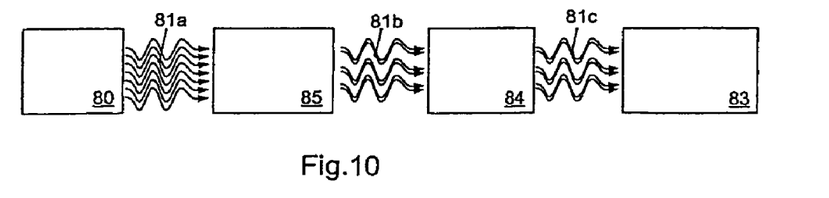
FIG. 10 shows a schematic illustration of an arrangement having an influencing unit for modifying a wavefront of an optical beam.

If the heating of the thermo-optically active layer is carried out by means of radiant heat then, as illustrated schematically in FIG. 10, at least one external radiation source 80 is needed for this purpose. The latter produces radiant heat 81a needed for producing the thermal pattern in the influencing unit, identified by 83 here. Using a unit 85, the radiant heat 81a has a suitable intensity distribution impressed on it by an imaging process (→information-carrying radiant heat 81b). Suitable as imaging processes are, for example, mechanical masks or liquid crystals which are completely, partly or not at all transparent to radiation only at predefined locations. Time-controlled deflection mirrors (what are known as galvanometer mirrors) can also be used as imaging processes. The information-carrying radiant heat 81b is subsequently projected by imaging optics 84 onto the point on the wavefront modulator (fluid or gel layer) to be heated (focused radiant heat 81c).

Figure 11:
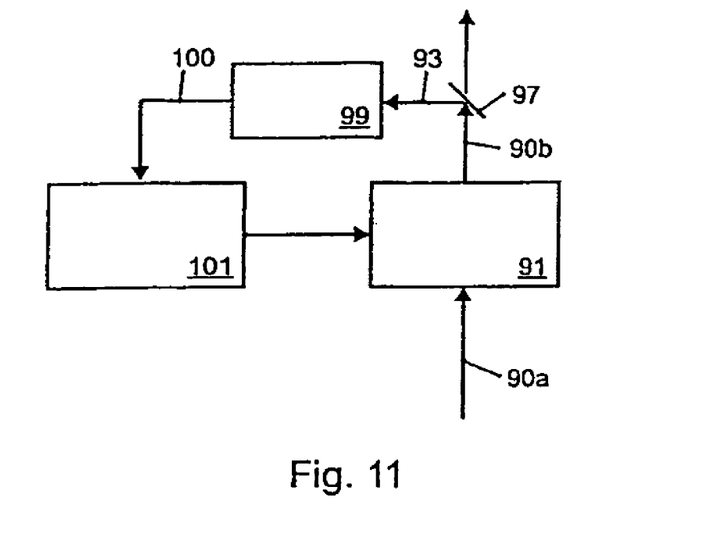
FIG. 11 shows a schematic illustration of an arrangement for checking a wavefront of an incident beam modified by an influencing unit and a correction if the modified wavefront does not correspond to the stipulation.

By means of a thermo-optically adaptive mirror or a wavefront modulator, the wavefront of a beam, here for example the beam 90a, can be influenced in a tailored manner. In order to check and readjust the influence, it is possible to operate with what is known as a "closed-loop" arrangement, which FIG. 11 shows. In this case, the incident radiation 90a is "modulated" by an influencing unit 91. In order to determine the wavefront of the beam 90b emerging from the influencing unit 91, a partial beam 93 is led onto a beam diagnostic detector 99 via a physical beam splitter 97 (and not a geometric beam splitter). As opposed to the geometric beam splitter, the physical beam splitter 97 does not change the relative intensity distribution over the beam cross section. Using the beam diagnostic detector 99, the beam profile of the partial beam 93 coupled out of the emergent beam 90b can preferably be determined in addition to the wavefront. The output signal 100 from the beam diagnostic detector 99 is fed to a unit 101 which has a unit for the production and appropriate correction of a requisite thermal pattern. The unit 101 then acts in an appropriate way on the influencing unit 91. If the wavefront of the emergent beam 90b deviates from the predefined result, appropriate corrections can be made in order to obtain the desired output beam 90b. The beam diagnostic detector 99 can contain a Shack-Hartmann detector, already mentioned above.

Figure 12:
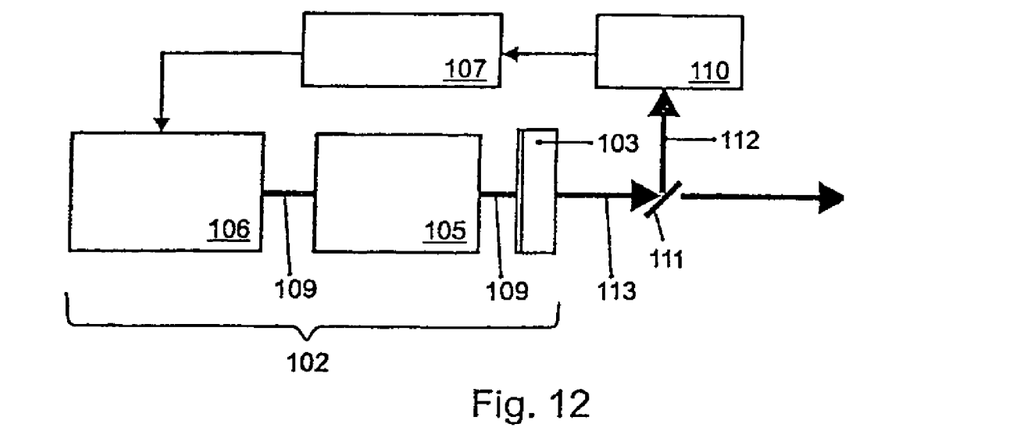
FIG. 12 shows a schematic illustration of an arrangement of a "custom-mode" resonator having a thermo-optically adaptive resonator mirror.

The modes of an optical resonator 102, which is indicated in FIG. 12 by the position of its output mirror 103, an amplifier (e.g. laser crystal) 105 and the other resonator mirror 106, may be influenced in a tailored manner by means of an influencing unit as described above. In particular, undesired aberrations can be corrected and "custom modes" can also be generated. Instead of a conventional 100% resonator mirror 106, this is designed as a thermo-optically active mirror 106. The wavefront of the resonator radiation 109 incident on the mirror 106 and reflected back again by the latter in the laser resonator 102 is set via a thermal pattern produced by a unit 107 in such a way that any aberrations of the amplifier 105 are compensated for and a desired transverse intensity distribution of the resonator radiation 109 is produced. With the aid of a beam profile measurement with a beam diagnostic detector 110, onto which a part 112 of the output radiation 113 is brought via a physical beam splitter 111, it is possible to check whether the desired result has been achieved. If not, the thermal pattern generated by the unit 107 is modified accordingly.

Instead of forming the 100% mirror as a wavefront modulator, a conventional 100% resonator mirror can also be used and a wavefront modulator transmitting the resonator radiation can be arranged as an additional element in the resonator.

The invention claimed is:

1. A method for modifying a wavefront of an optical beam, whereas a two-dimensional modulation layer is arranged transversely with respect to an optical axis of the beam in such a way that a beam cross section of the optical beam is accommodated approximately completely, at least one of two basal surfaces of the modulation layer in a region accommodating the optical beam is cooled two-dimensionally, the modulation layer being directly locally loaded by a thermal pattern that is externally produced by a heat source that is independent of the radiation of the optical beam whose wavefront is to be influenced, and a layer thickness being chosen to be so thin that propagation of heat transversely with respect to the optical axis is negligibly small, the layer thickness being chosen to be so thick and the thermal pattern being chosen such that the wavefront of the incident beam becomes capable of modification by the thermal pattern on the basis of thermal action on the modulation layer.

2. An arrangement for realizing the method as claimed in claim 1 for modifying a wavefront of an optical beam having an optical axis with an influencing unit which can be introduced into its beam path, and a heat source with which a thermal pattern can be produced in the influencing unit, whereas the heat source is independent of the radiation of the optical beam whose wavefront is to be influenced, the influencing unit has at least one two-dimensional cooling plate running transversely with respect to the optical axis and a two-dimensional modulation layer in a region accommodating the optical beam having at least one basal surface, the modulation layer is designed for the at least partial absorption of the heat of the heat source and has a two-dimensional extent which is sufficiently large to accommodate the beam cross section approximately completely, and the layer thickness of the modulation layer is designed to be so small that only a negligibly small flow of heat transversely with respect to the beam axis can take place, and the layer thickness is so thick that the wavefront of the incident beam can be modified directly by the impressed thermal pattern on the basis of thermal action on the modulation layer.

3. An influencing unit for an arrangement as claimed in claim 2 for modifying a wavefront of an optical beam, the influencing unit being introduced into the beam path of the optical beam to accommodate its beam cross section approximately completely, having a two-dimensional modulation layer having at least one basal surface which is arranged transversely with respect to the optical axis in such a way that it can also accommodate the beam cross section of the beam approximately completely, at least one two-dimensionally cooling plate on whose one basal surface the at least one basal surface of the modulation layer in a region accommodating the optical beam is arranged in intimate contact and the modulation layer can be directly loaded by a thermal pattern being externally produced by a heat source is independent of the radiation of the optical beam whose wavefront is to be influenced, the modulation layer having a layer thickness which is chosen to be so thin that two-dimensional propagation of heat is negligibly small, and is chosen to be so thick that the wavefront of the incident beam can be modified by the impressed thermal pattern on the basis of thermal action on the modulation layer.

4. The influencing unit as claimed in claim 3, characterized in that the material of the at least one cooling plate is transparent and without noticeable absorption for radiant heat producing the thermal pattern.

5. The influencing unit as claimed in claim 3, characterized in that the material of the at least one cooling plate is transparent and without noticeable absorption for the optical radiation.

6. The influencing unit as claimed in claim 3, characterized in that the modulation layer is transparent to the optical radiation.

7. The influencing unit as claimed in claim 3, characterized in that the modulation layer is delimited by a front and a rear cooling plate.

8. The influencing unit as claimed in claim 1, characterized by a reflective covering which is in intimate contact with one of the basal surfaces of the modulation layer, which reflects the incident optical beam with a predefined reflection factor and preferably the reflective covering is designed to be deformable.

9. The influencing unit as claimed in claim 3, characterized by a deformable layer covering which is arranged directly on the basal surface of the modulation layer opposite the cooling plate and which is as completely transparent to the optical beam as possible.

10. The influencing unit as claimed in claim 3, characterized by only one cooling plate that is transparent to the optical beam and a heating layer which is arranged on the basal surface of the modulation layer opposite the cooling plate and which can produce a locally different thermal pattern.

11. The influencing unit as claimed in claim 3, characterized in that the modulation layer is a fluid or gel layer with a layer thickness which is the same apart from a tolerance, and the thermal pattern to be impressed can be impressed on the modulation layer with an appropriate intensity distribution using a two-dimensionally acting radiant heat.

12. The influencing unit as claimed in claim 3, characterized in that the two-dimensional modulation layer has a different thickness profile, the thermal pattern to be impressed in the modulation layer can be produced by incident radiation, the incident radiation is at least so wide that the greatest layer thickness can be irradiated, the layer thickness of the modulation layer nevertheless being chosen to be so thin that two-dimensional propagation of heat is negligibly small, and it is chosen to be so thick that the wavefront of the incident beam can be modified by the impressed thermal action on the basis of thermal action on the modulation layer, and the material of the modulation layer is preferably a fluid or gel.

13. An influencing unit for an arrangement as claimed in claim 2 for modifying a wavefront of an optical beam, the influencing unit being introduced into the beam path of the optical beam to accommodate its beam cross section approximately completely, having a two-dimensional modulation layer having at least one basal surface in a region accommodating the optical beam which is arranged transversely with respect to the optical axis in such a way that it can also accommodate the beam cross section of the beam approximately completely, at least one two-dimensionally cooling plate, whereas the modulation layer can be directly loaded by a thermal pattern being externally produced by a heat source is independent of the radiation of the optical beam whose wavefront is to be influenced, the modulation layer having a layer thickness which is chosen to be so thin that two-dimensional propagation of heat is negligibly small, and is chosen to be so thick that the wavefront of the incident beam can be modified by the impressed thermal pattern on the basis of thermal action on the modulation layer.

14. The influencing unit as claimed in claim 3, characterized by a heating layer which is arranged on a basal surface of the modulation layer and which can produce a locally different thermal pattern.

15. The method as claimed in claim 1, whereas a heat source, which is not the optical beam itself, is used to impress the thermal pattern.

* * * * *